(12) United States Patent
Valverde et al.

(10) Patent No.: US 11,373,510 B1
(45) Date of Patent: Jun. 28, 2022

(54) HAND WASHING MONITORING SYSTEM

(71) Applicants: Antonio Valverde, Redlands, CA (US);
Airel Valverde, Redlands, CA (US);
Candice Valverde, Redlands, CA (US)

(72) Inventors: Antonio Valverde, Redlands, CA (US);
Airel Valverde, Redlands, CA (US);
Candice Valverde, Redlands, CA (US)

( * ) Notice: Subject to any disclaimer, the term of this patent is extended or adjusted under 35 U.S.C. 154(b) by 0 days.

(21) Appl. No.: 17/012,311

(22) Filed: Sep. 4, 2020

(51) Int. Cl.
*G08B 21/24* (2006.01)
*G06K 7/10* (2006.01)
*G08B 5/36* (2006.01)
*A47K 5/12* (2006.01)

(52) U.S. Cl.
CPC .......... *G08B 21/245* (2013.01); *A47K 5/1202* (2013.01); *G06K 7/10366* (2013.01); *G08B 5/36* (2013.01)

(58) Field of Classification Search
CPC ....................................................... G08B 21/00
See application file for complete search history.

(56) References Cited

U.S. PATENT DOCUMENTS

| | | | |
|---|---|---|---|
| 6,375,038 B1 * | 4/2002 | Daansen | A47K 5/1217 222/39 |
| 9,830,800 B2 | 11/2017 | Park | |
| 10,438,476 B2 | 10/2019 | Sengstaken | |
| 2010/0207767 A1 * | 8/2010 | Verdiramo | G08B 21/245 340/573.1 |
| 2010/0323939 A1 * | 12/2010 | Eng | A61Q 17/005 510/138 |
| 2011/0227740 A1 * | 9/2011 | Wohltjen | G01S 11/16 340/573.1 |

\* cited by examiner

*Primary Examiner* — Nabil H Syed
*Assistant Examiner* — Cal J Eustaquio
(74) *Attorney, Agent, or Firm* — Sanchelima & Associates, P.A.; Christian Sanchelima; Jesus Sanchelima

(57) ABSTRACT

A hand washing monitoring system includes a sensor to detect hands. An identification article and identification sensor, a timer, and a screen to provide notifications to a user is also included. The identification article may be provided in the form of an identification card having an LED status light. The LED status light then switches between two different light colors depending on a sanitization status of an employee. Sensors are then mounted in different locations of a work environment which will then cause the LED status light to change color. In one embodiment, when a sanitized worker leaves a kitchen area, the LED status light changes color. The color will then return to normal only when the employee passes by a sanitization station to sanitize their hands.

1 Claim, 2 Drawing Sheets

US 11,373,510 B1

HAND WASHING MONITORING SYSTEM

BACKGROUND OF THE INVENTION

1. Field of the Invention

The present invention relates to a hand washing monitoring system and, more particularly, to a hand washing monitoring system that includes a sensor to detect hands and an identification sensor to monitor an employee's sanitization status.

2. Description of the Related Art

Several designs for a monitoring system have been designed in the past. None of them, however, include a hand washing monitoring system having a sensor to detect hands. An identification article and identification sensor, a timer, and a screen to provide notifications to a user is also included. The identification article may be provided in the form of an identification card having an LED status light. The LED status light then switches between two different light colors depending on a sanitization status of an employee. Sensors are then mounted in different locations of a work environment which will then cause the LED status light to change color. In one embodiment, when a sanitized worker leaves a kitchen area, the LED status light changes color. The color will then return to normal only when the employee passes by a sanitization station to sanitize their hands. It is known that due to recent health concerns over the Covid-19 pandemic, it is imperative that restaurant owners take the appropriate measures to ensure that their employees are properly sanitized when handling food. Even though there may be certain rules and regulations in place to prevent the spread of unwanted diseases and bacteria, it is imperative to implement technology to aid in the maintaining of sanitized employees in the workplace.

Applicant believes that a related reference corresponds to U.S. Pat. No. 9,830,800 issued for a system for monitoring compliance to regulations in a work zone that utilizes radio frequency sensors to register an employee's compliance to hand washing and other requirements. Applicant believes that another related reference corresponds to U.S. Pat. No. 10,438,476 issued for a wireless hand hygiene tracking system in which multiple stations have transmitters to detect the presence of a person. However, the present invention differs from the cited references because they fail to provide a hand washing monitoring system for implementing in a restaurant business. The system including a sensor to detect hands and an identification article having an identification sensor tied to an LED indicator light. The LED indicator light will change to indicate that a user needs to go through a sanitation procedure. The LED light will then revert back to normal when a user sanitizes at a sanitizing station.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a hand washing monitoring system that aids in maintaining sanitized workers in a restaurant environment.

It is another object of this invention to provide a hand washing monitoring system that provides employees with a reminder to sanitize their hands to ensure there is no contamination in a restaurant environment.

It is still another object of the present invention to provide a hand washing monitoring system with sensors placed at different locations along a restaurant environment to update an employee's sanitation status.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
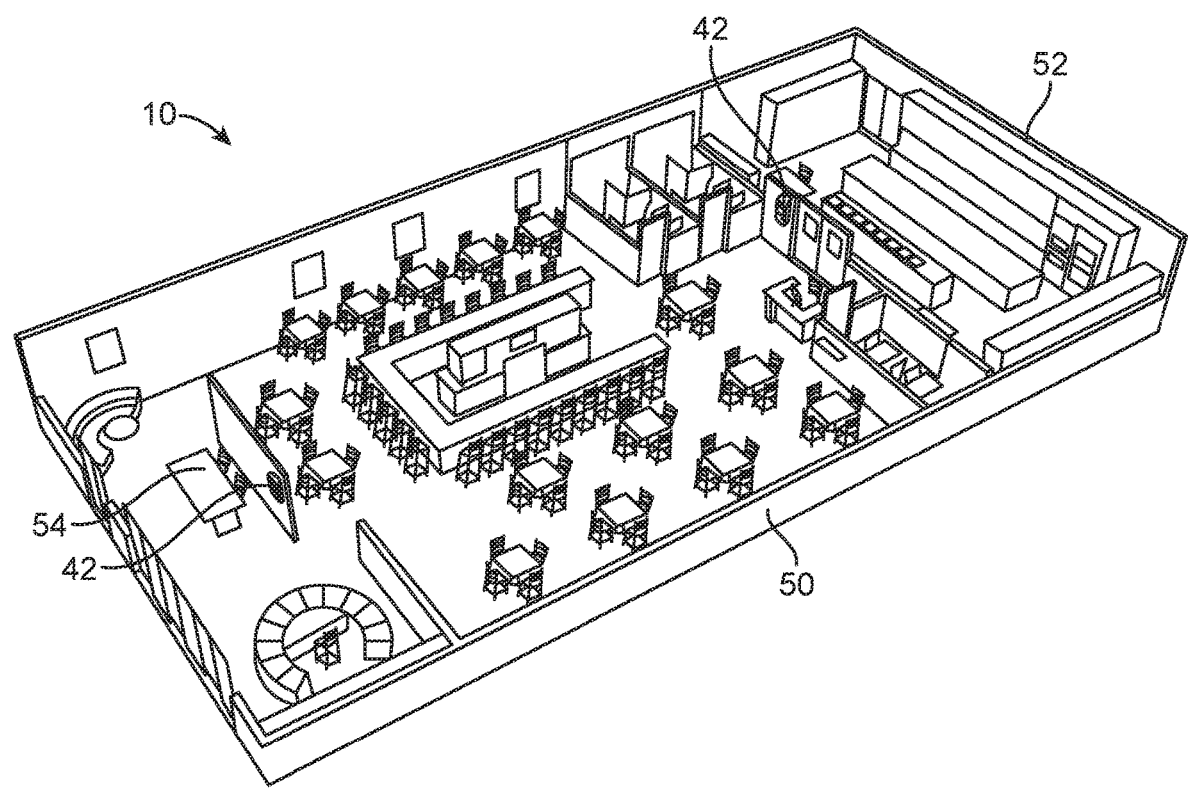
FIG. 1 represents an operational isometric view of hand washing monitoring system 10 in accordance to an embodiment of the present invention.
Figure 2:
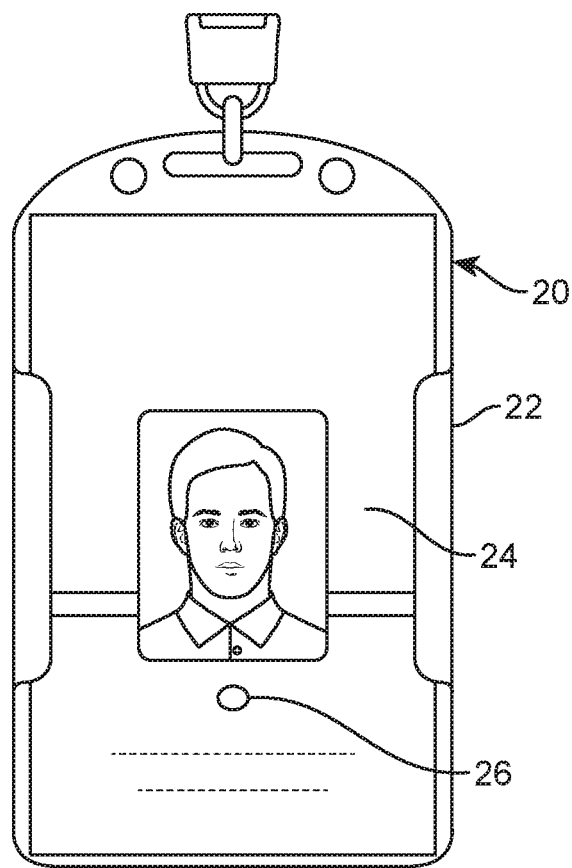
FIG. 2 shows an isometric view of an identification assembly 20 in accordance to an embodiment of the present invention.

Referring now to the drawings, where the present invention is generally referred to with numeral 10, it can be observed a hand washing monitoring system 10 which basically includes an identification assembly 20 and a sanitization station assembly 40.

Identification assembly 20 includes an identification article 22 which is configured to be suitable for a restaurant environment 50. In one embodiment, identification article 22 is provided as an identification card which is commonly worn be employees. These identification cards may be worn around the neck via a lanyard or may even be clipped onto an employee's shirt using a clip. Identification article 22 further includes elements which allows for the identification of an employee in the restaurant environment 50. This may include printed matter on the article such as a picture of the employee in addition to a name or a unique identification number. It should be understood that other forms of articles may be used for identification article 22 and is not limited to only being in the form of an ID card. Other embodiments may feature an identification button in the form of a button, wristband, or other commonly used clothing articles. Identification article 22 may further be used to identify an area of restaurant environment 50 to which an employee is assigned too.

Identification article 22 further includes a sensor 24 mounted thereon. In one embodiment, sensor 24 is provided as an RFID (Radio Frequency Identification) tag which may be configured to be detected by an RFID reader. Sensor 24 may be provided as hardware mounted within the identification article 22 or mounted to an outer portion of identification article 22. Additionally, sensor 24 may implement other various types of sensors such as GPS sensor systems that allows a user to track a location of identification article 22. Furthermore, identification article 22 includes a status LED (light emitting diode) 26 mounted to a front portion. In one implementation, status LED 26 is configured to change color depending on a sanitization status of an employee. The status LED 26 may be provided as a bi-color LED having a green color and a red color. The green color may represent a sanitized status that is initiated once an employee has utilized sanitization station assembly 40 to sanitize their hands. The status LED may transition to a blinking red color once a user has left a predetermined area of restaurant environment 50. Once the employee has left this area, they are no longer considered to be sanitized and must be sanitized through sanitization station assembly 40 in order to return to their predetermined area. In the present embodiment, the pre-determined area may be represented as a kitchen area or cashier area of restaurant environment 50. Other locations of restaurant environment 50 may be used for the predetermined areas of the present system.

Sanitization station assembly 40 includes ID proximity sensors 42 that is placed in different locations of restaurant area 50. In the present embodiment, ID proximity sensors 42 help establish the predetermined locations of restaurant environment 50. In one implementation, ID proximity sensors 42 are mounted near a kitchen area, a bathroom area, and a cashier area of restaurant environment 50. ID proximity sensors 42 may be provided as an RFID reader that is configured to detect the presence of sensor 24 when it comes within a predetermined area. In one example, an employee is working in the kitchen area of restaurant environment 50. The employee then decides to leave the kitchen area and passes near ID proximity sensors 42. This will then cause the status LED 26 of identification assembly 20 to change color thereby indicating the employee as un-sanitized. The visual read color will allow the manager or customers of the restaurant know that the employee is currently un-sanitized. In one embodiment, the manager will receive a notification on a mobile device alerting them of the un-sanitized employee.

Figure 3:
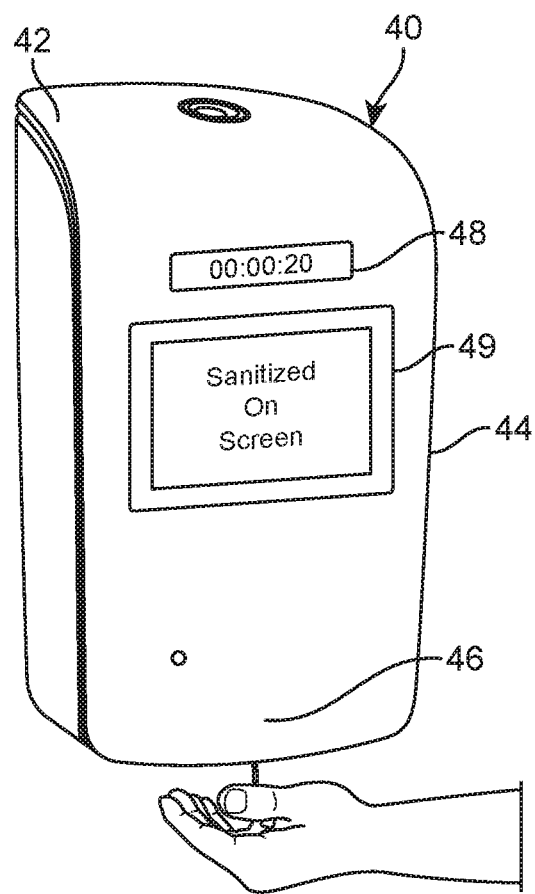
FIG. 3 illustrates an isometric view of a sanitization station assembly 40 in accordance to an embodiment of the present invention.

Sanitization station assembly 40 further includes a sanitizer 44 which is utilized to sanitize an employee. In one embodiment, sanitizer 44 is provided as an automatic sanitization dispenser that is located along different locations of restaurant environment 50. FIG. 3 depicts sanitizer 44 in accordance to one embodiment of the invention. Sanitizer 44 may be provided on a stand or may be mounted to a wall for an employee to utilize. Additionally, sanitizer 44 further includes ID proximity sensor 42 to detect the presence of an employee. Sanitizer 44 also includes a hand proximity sensor 42 to detect the presence of an employee's hand as they approach sanitizer 44. In the present embodiment, an un-sanitized employee approaches sanitizer 44 to sanitize their hands in order to change their sanitization status. The employee will then utilize sanitizer 44 for a predetermined amount of time (20 seconds in one embodiment) that will be indicated by timer 48. Timer 48 may display the required amount of time for an employee to be sanitizing their hands. Additionally, timer 48 may be mounted to a front end of sanitizer 44 to be visibly displayed. Once the predetermined amount of time has lapsed, a screen 49 located on the sanitizer 44 will provide the employee with a notification to notify them that they have been sanitized. In one embodiment, screen 49 is provided as a touch screen or an LED screen. Additionally, the status LED 26 will be configured to change color once this notification has been displayed. In one example, the light will return to a green color thereby notifying the manager and other employees that the employee is now sanitized. As a result, the employee will then be allowed back into their respective area to continue working.

In yet another implementation, status LED 26 will be on a timer and configured to change to a color representing an un-sanitized status after a predetermined amount of time. After working in a specific area for a predetermined amount of time (every two hours in one embodiment) the status LED 26 will change color to remind the employee to regularly sanitize themselves. The employee will then have to pass by sanitization station assembly 40 to sanitize themselves before returning to their designated areas. The disclosed system helps ensure that a restaurant environment remains sanitized and ensures the safety of their customers.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hand washing monitoring system, consisting of:
   a restaurant environment including a kitchen area and a cashier area;
   an identification assembly including an identification (ID) article in the form of an ID card, wherein said ID card is a rectangular card with an opening on a top end to receive a lanyard, wherein said ID card includes an identification number, wherein said ID card further includes a sensor in the form of a Radio Frequency Identification (RFID) tag placed within said ID card, said ID card further including a status LED mounted to a front end, wherein said status LED is circular in shape and is configured to change color, wherein said status LED indicates a sanitization status of a user;
   a sanitization station assembly including an ID proximity sensor being an RFID reader mounted near said kitchen area and said cashier area, wherein said RFID reader detects a presence of said ID card, wherein said status LED changes color to indicate an un-sanitized status upon detection of said RFID reader, said sanitization station assembly further including a sanitizer being an automatic hand sanitizer dispenser mounted on a stand, wherein said sanitizer is located at said kitchen area and said cashier area, said sanitizer further including said ID proximity sensor to detect said presence of said ID card, wherein said sanitizer further includes a hand proximity sensor configured to detect the presence of a user's hands, wherein said sanitizer further includes a timer displaying a predetermined amount of time being twenty seconds adapted to represent an amount of time for a user to sanitize, wherein said sanitizer further includes an LED screen which displays a notification once said predetermined amount of time has lapsed, wherein said sanitizer further includes a display screen that notifies said user once said predetermined amount of time has expired, wherein said timer of the sanitizer is actuated upon detection of said hand proximity sensor and detection of said ID proximity sensor, wherein said status LED of the ID article changes color upon expiration of said timer for the sanitizer to indicate a sanitized status, wherein said ID card includes an ID timer which changes a color of said status LED once two hours of time has lapsed to indicate an un-sanitized status.

* * * * *